United States Patent [19]
Huang-Mo et al.

[11] Patent Number: 5,605,086
[45] Date of Patent: Feb. 25, 1997

[54] COMPOUND MITER SAW

[76] Inventors: Hsieh Huang-Mo; Mary Wang, both of Suite 1, 11F, No. 95-8, Chang Ping Road, Sec. 1, Taichung, Taiwan

[21] Appl. No.: 402,115

[22] Filed: Mar. 14, 1995

Related U.S. Application Data

[63] Continuation of Ser. No. 205,177, Mar. 3, 1994, abandoned.

[51] Int. Cl.[6] ........................................ B26D 7/01
[52] U.S. Cl. ................ 83/759; 83/781; 83/467.1; 269/10; 269/296; 269/305; 269/319
[58] Field of Search ..................... 83/467.1, 758, 83/759, 781; 144/286 A, 286 R; 269/9, 10, 296, 303, 304, 305, 315, 316, 319, 900

[56] References Cited

U.S. PATENT DOCUMENTS

| | | | |
|---|---|---|---|
| 877,651 | 1/1908 | Knudson | 83/758 |
| 3,294,393 | 12/1966 | Pilsetnieks | 269/305 |
| 5,064,321 | 11/1991 | Barnes | 269/303 X |

*Primary Examiner*—Rinaldi I. Rada
*Assistant Examiner*—Raymond D. Woods

[57] ABSTRACT

A compound miter saw comprises a base, an arm rotatingly connected thereto about a horizontal plane, and a pair of adjustable vertical saw supporting members on either end thereof. The improvement thereof comprises a plurality of longitudinally aligned rows of projections formed on the support surface of the base. A workpiece can be supported at an elevated angle along the support surface wherein one side thereof rests against a guide plate along one side of the base and an adjoining corner portion is ensconced between a selected pair of adjacent rows. Each pin of adjacent rows of projections provides a unique elevation angle.

1 Claim, 3 Drawing Sheets

5,605,086

1
COMPOUND MITER SAW

This is a continuation application of U.S. patent application Ser. No. 08/205,177, filed Mar. 3, 1994, now is abandoned.

BACKGROUND OF THE PRESENT INVENTION

The present invention relates to an improved compound miter, and more particularly to an improved compound miter saw having a novel support bed structure which provides angular positioning control of a workpiece about a longitudinal axis thereof.

Miter saws that enable adjustable positioning of a cutting saw about horizontal and vertical planes so as to facilitate cuts at compound angles are known but do not teach use of aligned rows of discrete projections on the support surface thereof which in cooperation with a parallel vertical side plate enables an elevated angular support of a workpiece thereover so as to provide a further control over the cutting angle and to facilitate and hasten the cutting process.

SUMMARY OF THE PRESENT INVENTION

The compound miter saw of the present invention embodies an elongate support base having a centrally disposed arm hingedly attached thereunder for positioning a pair of saw supports at a selected horizontal angle with respect to a workpiece, and a vertical angular positioning means for controlling the vertical angle of the saw supports, as found in conventional compound miter saws.

In the improvement thereof, a conventional support base for a workpiece is provided with a guide plate of predetermined height along one lateral side thereof, and a plurality of longitudinal aligned rows of projections thereon each at a predetermined separation from the guide plate. Wherein, adjacent longitudinal and perpendicular walls of a workpiece are supported above the base by a selected adjacent pair of rows of projections and the guide plate, such as to assume a selected predetermined angle with respect to the base, facilitating the cutting of compound angles on the workpiece.

The improved compound miter saw of the present invention has as a main object to provide a compound miter saw which facilitates the cutting of a workpiece at compound angles, wherein cuts at commonly required angles can be performed quickly and with precision without a high degree of skill required on the part of an operator.

For a more thorough understanding of the present invention reference should be made to a detailed description of a preferred embodiment thereof, provided below along with accompanying drawings.

DETAILED DESCRIPTION OF THE PREFERRED EMBODIMENT

Figure 1:
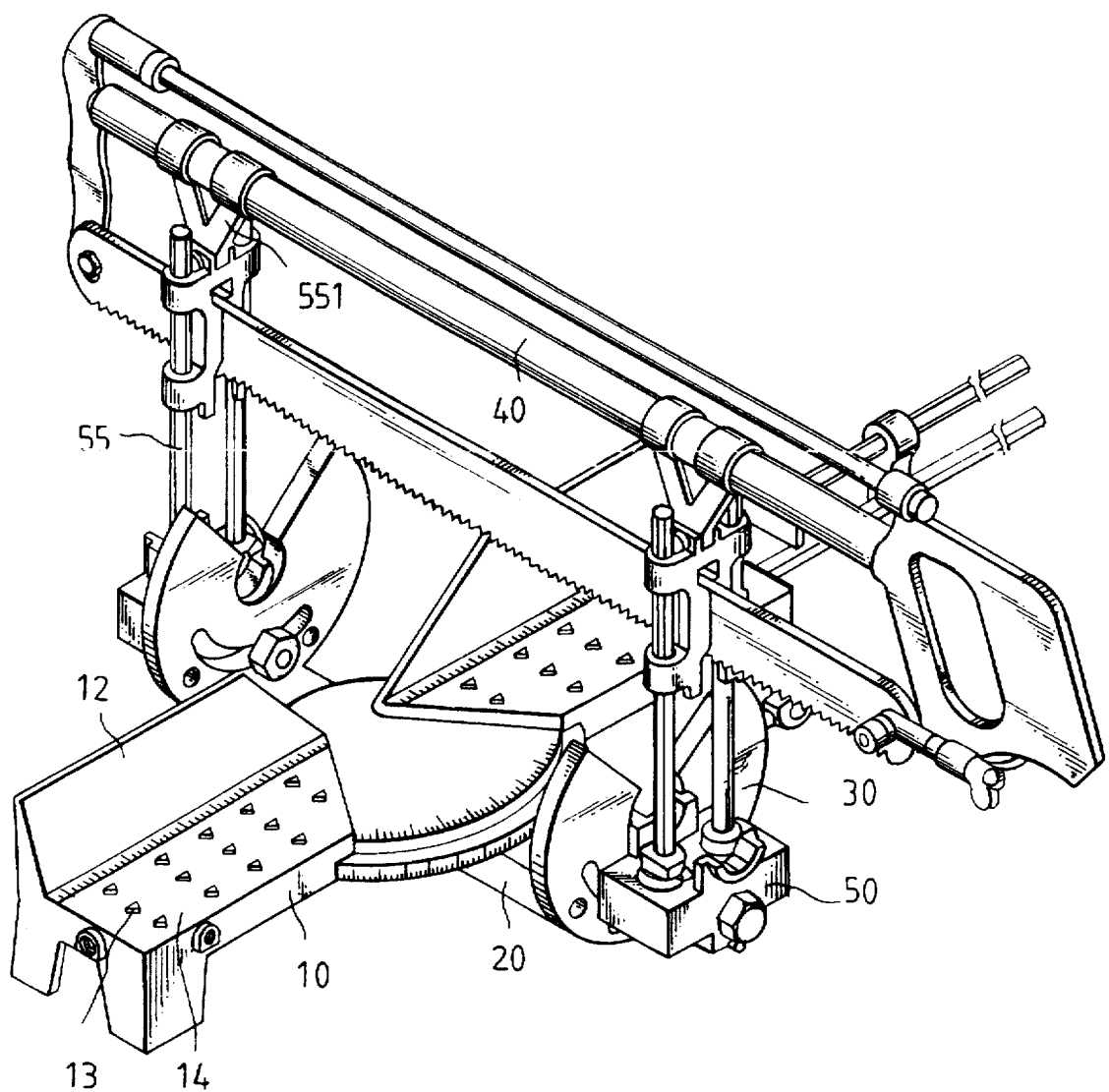
FIG. 1 is a perspective view of the compound miter saw of the present invention.

Referring to FIG. 1 of the drawings, the compound miter saw of the present invention comprises generally an elongate base 10, an elongate arm 20 rotatingly disposed to the base 10 at a central position thereunder, a pair of positioning plates 30 fixed to respective ends of the arm 20 and a pair of holder blocks 50 releasably securable to the positioning plates at selected predetermined angles. As in more conventional compound miter saws, the transverse arm 20 can be manually pivoted in a horizontal plane about base 10 to a selected angular orientation and releasably secured in place. Each holder block 50 has a pair of parallel guide rods 55 fixed on one end thereto which extend generally in a vertical direction, as determined by the angular positioning of the holder blocks 50 to respective plates 30 when attached thereto. A hack saw 40 is linkedly connected to a pair of sliders 551 which are slidingly engaged with respective pairs of guide rods 55 on the holder blocks 50.

Figure 2:
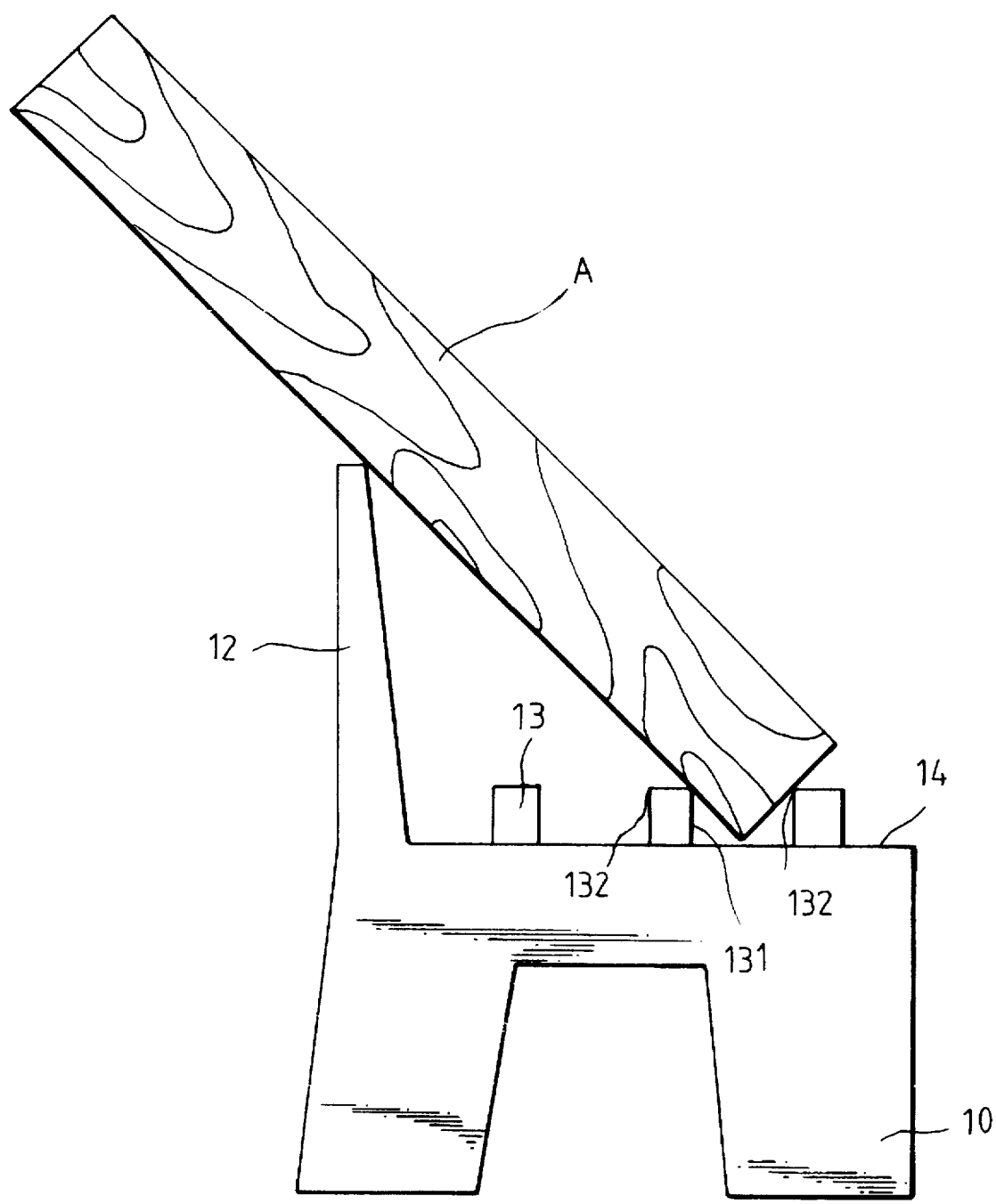
FIG. 2 is an end on view of the base of the miter saw showing the angular positioning of a rectangular sectioned workpiece thereover, implemented via triangular projections on the support surface and a guide plate along one side thereof.

The support surface 14 of base 10 has three rows of projections 13 thereon extending in a longitudinal direction with each projection having a triangular section and a predetermined height above the support surface. A guide plate 12 along one side of the base 10 rises in a generally vertical direction to a predetermined height thereabove. Each row of projections has a predetermined separation from plate 12. A workpiece A having a cross section which is significantly rectangular and is of sufficient breadth and height can positioned along the base 10 at a selected elevated angle above the support surface, as shown in FIG. 2, wherein a first rectangular side portion of the workpiece A near a corner thereof is in abutment with a first row of projections 13 while a perpendicular second side portion proximate the mutual corner is in abutment with an adjacent row of projections, third portion of the workpiece A distal from the corner and parallel with the second side portion is in abutment with the upper edge of plate 12. Note that a first base side 131 of each projection is aligned with the longitudinal direction of the base 10 and as such the first side portion of a workpiece is in abutment therewith when the row is the distal half relative the guide plate of an adjacent pair of rows supporting the workpiece, while an opposing apex 132 on each projection abuts the second side portion of a workpiece when the row is the proximate half of an adjacent pair of rows supporting a workpiece. The relatively sharp apexes 132 of the projections further act to grip the workpiece and prevent possible sliding thereof away from the bases 131 of an adjacent row of projections 13 while performing cutting operations with the usual to and fro motions of a saw. Each pair of adjacent rows provides a unique predetermined angle of support for a workpiece along the base so as to provide further means of controlling the angle of cut in addition to the horizontal angular positioning of arm 20 and the vertical angular positioning of guide rods 55, and thus facilitate the cutting of complex angles on a workpiece.

Figure 3:
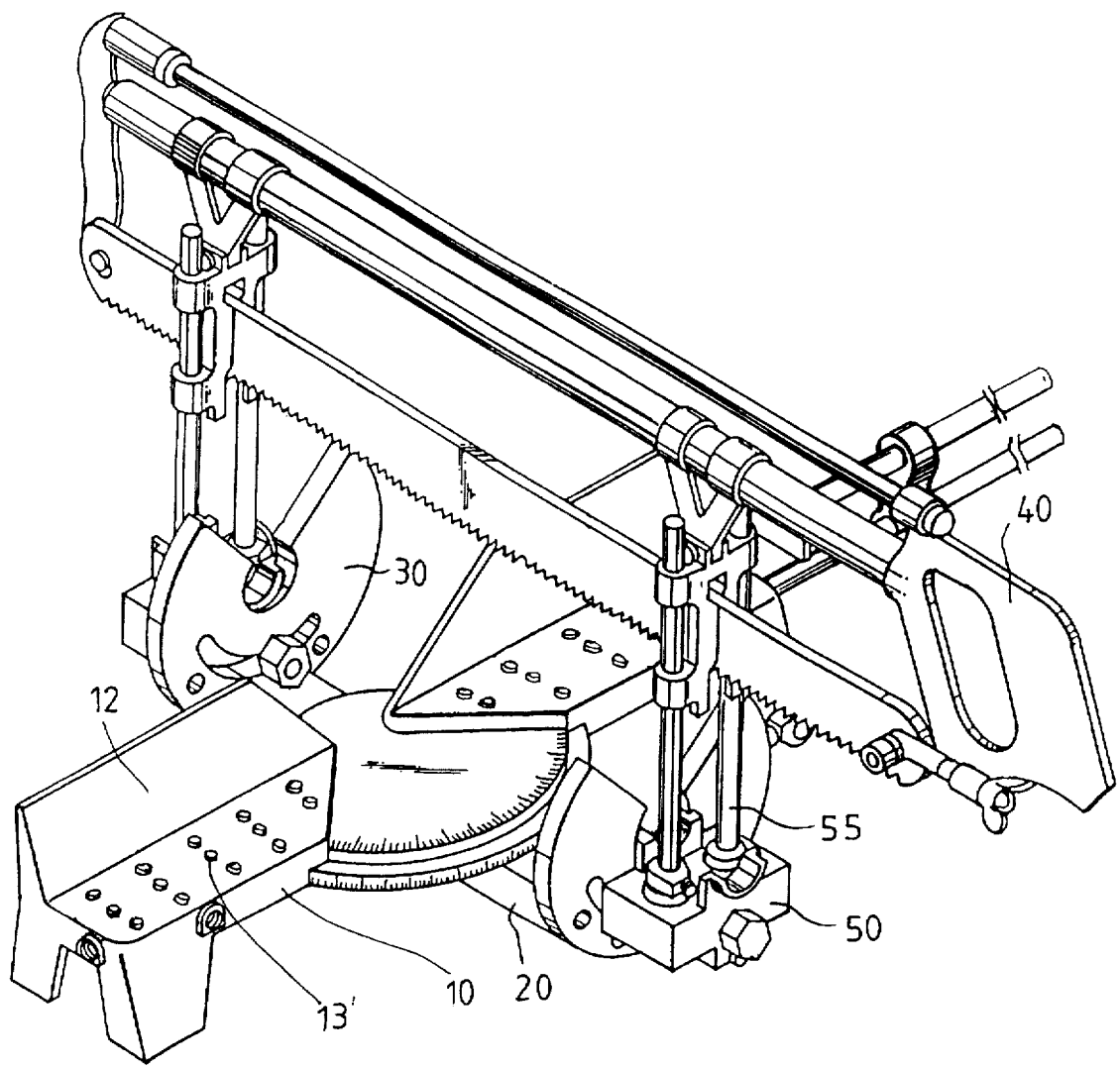
FIG. 3 is a perspective view of an alternate embodiment of the miter saw having cylindrical projections.

FIG. 3 shows an alternate embodiment of the miter saw of the present invention, wherein the projections 13' are generally cylindrical so that workpieces that are of a particularly soft material may be worked with lessened risk of marring or scratching. Many other variations and modifications could also be accomplished by a person of ordinary skill in the art, and as such the actual spirit and scope of the present invention should be determined not by the limitations of the above description but from the appended claims and their legal equivalents.

I claim:

1. An improved compound miter saw of a type characterized in having an elongate base for supporting a workpiece over a generally planar support surface of said base, a transverse arm adjustably secured in horizontal angle to said base at a central position thereunder, and at least two mutually parallel guide rods adjustably secured in vertical angle on each end portion of said arm for supporting a saw at a selected angle with respect to a vertical plane, wherein the improvement thereof comprises:

a guide plate fixed to one side of said base extending vertically in a substantially perpendicular direction with respect to said support surface, an upper terminal edge thereof being at a predetermined height above said support surface.

a plurality of rows of discrete guide projections on said support surface extending parallel to the longitudinal direction thereof with each row of said guide projections having a predetermined separation from said guide plate, whereby a suitably shaped workpiece having a substantially rectangular section is positionable over said support surface at a predetermined elevated angle with respect therewith wherein a first side of the workpiece is in abutment with a selected first row of said guide projections, a proximate portion of a perpendicular second side of the workpiece is in abutment with an adjacent second row of said guide projections, and a distal portion of the perpendicular second side is in abutment with the terminal edge of said guide plate, each pair of adjacent rows of said guide projections providing a unique elevational angle to the workpiece, said guide projections having a triangular section, with a first base side of each said guide projections being aligned with the direction of the row thereof and abutting the first side of the workpiece, and an opposing apex of each said guide projections abutting the proximate portion of the perpendicular second side of the workpiece.

* * * * *